(12) United States Patent
Miyamoto et al.

(10) Patent No.: US 7,841,619 B2
(45) Date of Patent: Nov. 30, 2010

(54) INTERIOR COMPONENT FOR A VEHICLE AND METHOD OF MOUNTING THE SAME

(75) Inventors: Kazuaki Miyamoto, Utsunomiya (JP); Takashi Aoki, Kawachi-gun (JP); Shizuo Hosoya, Shioya-gun (JP); Takashi Nakamura, Utsunomiya (JP); Hiroyuki Isayama, Utsunomiya (JP); Koji Ikeda, Utsunomiya (JP); Masayuki Kaneko, Utsunomiya (JP); Nobumoto Sekiguchi, Shimotsuga-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 138 days.

(21) Appl. No.: 12/205,140

(22) Filed: Sep. 5, 2008

(65) Prior Publication Data

US 2009/0066062 A1 Mar. 12, 2009

(30) Foreign Application Priority Data

| Sep. 10, 2007 | (JP) | ............................. 2007-234649 |
| Sep. 10, 2007 | (JP) | ............................. 2007-234664 |
| Sep. 10, 2007 | (JP) | ............................. 2007-234665 |

(51) Int. Cl.
*B60R 21/20* (2006.01)

(52) U.S. Cl. .................................................. 280/728.3

(58) Field of Classification Search .............. 280/728.3, 280/728.2; 296/187.05, 187.11, 187.12, 296/193.06
See application file for complete search history.

(56) References Cited

U.S. PATENT DOCUMENTS

| 7,478,866 B2* | 1/2009 | Kim ...................... 296/187.05 |
| 2007/0176400 A1* | 8/2007 | Kamano .................. 280/730.2 |
| 2008/0238053 A1* | 10/2008 | Downey et al. .......... 280/730.2 |
| 2009/0064470 A1* | 3/2009 | Hosoya et al. ................. 24/458 |

FOREIGN PATENT DOCUMENTS

| CN | 1673011 | | 9/2005 |
| JP | 2000-335358 | | 12/2000 |
| KR | 2007036456 A | * | 4/2007 |
| KR | 2007046216 A | * | 5/2007 |

* cited by examiner

*Primary Examiner*—Faye M. Fleming
(74) *Attorney, Agent, or Firm*—Rankin, Hill & Clark LLP

(57) ABSTRACT

An interior component for a vehicle formed by superimposing a bottom edge portion of a second interior component on a top edge portion of a first interior component or by placing these portions so as to face against each other, and by joining these interior components together by a joining component, wherein the joining component includes: a top supporting portion joined to a back surface of the second interior component, which supports a top edge side of the second interior component; and a bottom engaging portion provided underneath of and separated from the top supporting portion, which engages the bottom edge of the second interior component with the first interior component.

11 Claims, 8 Drawing Sheets

INTERIOR COMPONENT FOR A VEHICLE AND METHOD OF MOUNTING THE SAME

BACKGROUND OF THE INVENTION

1. Field of the Invention

The present invention relates to an interior component for a vehicle and to a method of mounting an interior component for a vehicle.

Priority is claimed on Japanese Patent Application No. 2007-234649, filed Sep. 10, 2007, Japanese Patent Application No. 2007-234664, filed Sep. 10, 2007, and Japanese Patent Application No. 2007-234665, filed Sep. 10, 2007, the contents of which are incorporated herein by reference.

2. Description of Related Art

A curtain airbag apparatus has been developed that causes an airbag to unfold between a vehicle side wall and a vehicle occupant when the vehicle is in a collision.

In this curtain airbag apparatus, the airbag is housed in a folded state extending from a front pillar portion across a roof side portion as far as a rear pillar portion. When a shock is input, the airbag is unfolded by being blown up with high pressure gas from an inflator. While in a folded state, the airbag is covered on the vehicle compartment interior side by a pillar garnish and a roof lining. When a shock is input, the airbag pushes open a portion of the pillar garnish and the roof lining using thrust force from the high pressure gas.

The airbag of this curtain airbag apparatus is normally placed within a range covering the entire roof side rail portion and portions of both the front pillar portion and the rear pillar portion. Because of this, in each pillar portion, a portion in the direction in which the pillar garnish extends is partially pushed open. As a result, when the airbag is unfolded by the pillar portion, the airbag which is about to be unfold receives considerable resistance from the pillar garnish, and it becomes difficult to control the attitude in which the airbag unfolds.

Consequently, in order to deal with this problem, a structure has been proposed for a pillar garnish in which a thin breakable portion is formed in the pillar garnish. When the airbag is unfolded, the pillar garnish is broken at this breakable portion (see Japanese Unexamined Patent Application, First Publication No. 2000-335358).

In this pillar garnish structure, unnecessary increase in the unfolding resistance of this airbag is reduced by forming this thin breakable portion in advance in the pillar garnish. However, there is a concern that manufacturing the pillar garnish will become more complex, and that this will lead to an increase in manufacturing costs.

Accordingly, research has been done into constructing interior components of pillar garnish and the like from a plurality of components that are butted together end-to-end. When the airbag is unfolded or the like, an end of one component is opened in the vicinity of a boundary portion.

However, if a structure is employed in which the ends of a plurality of interior components are butted together, because interior components are generally made from materials having a low rigidity, it is difficult to maintain sufficient tension of interior component, and it is also difficult to ensure an accurate fit between the ends of the interior components.

Moreover, in the above-described conventional pillar garnish structure, a thin, breakable portion is formed that breaks easily when the air bag is unfolded. In this case, the breakable portion can be easily broken when the pillar garnish is being mounted on the vehicle body, and when the pillar garnish is being transported prior to being mounted on the vehicle body, and the like, and the increased difficulty in handling is a cause for concern.

Moreover, in the above-described conventional interior component mounting structure, the pillar garnish and the roof lining are mounted individually on a fixing portion on the vehicle body. Because of this, the pillar garnish and the roof lining are generally made from materials having a low rigidity, and it is difficult to ensure an accurate fit between the pillar garnish and the roof lining.

Therefore, it is an object of the present invention to provide an interior component for a vehicle which has sufficient tension and that makes it possible for the fitting accuracy to be improved.

It is a further object of the present invention to provide an interior component for a vehicle that does not hamper the ease of handling when it is being mounted on a vehicle body or when it is being transported prior to being mounted on the vehicle body, and that reduces unnecessary increase in the unfolding resistance of the airbag.

It is a further object of the present invention to provide a method of mounting an interior component for a vehicle that makes it possible for the fitting accuracy between a pillar garnish and a roof lining to be improved.

SUMMARY OF THE INVENTION

In order to achieve the above-described objects, the present invention employs the following.

(1) An interior component for a vehicle formed by superimposing a bottom edge portion of a second interior component on a top edge portion of a first interior component or by placing these portions so as to face against each other, and by joining these interior components together by a joining component, wherein the joining component includes: a top supporting portion joined to a back surface of the second interior component, which supports a top edge side of the second interior component; and a bottom engaging portion provided underneath of and separated from the top supporting portion, which engages the bottom edge of the second interior component with the first interior component.

In the above-described interior component for a vehicle, the top edge side of the second interior component is supported by the top supporting portion of the joining component so that the rigidity thereof is maintained. In addition to this, the bottom edge of the second interior component is engaged with the first interior component via the bottom engaging portion of the joining component. Accordingly, the second interior component is maintained sufficiently rigid between the top supporting portion and the bottom engaging portion. Moreover, it is possible to improve the fitting accuracy between the top edge portion of the first interior component and the bottom edge portion of the second interior component.

(2) It may be arranged such that: a vehicle body fixing portion fixed to a pillar portion of a vehicle body is provided in an area around a top portion of the second interior component, and a main body joining portion is provided to the second interior component in an area below the vehicle body fixing portion, the main body joining portion joined to the first interior component so as to allow relative displacement of the second interior component in a direction in which a bottom side boundary portion between the first interior component and the second interior component extends.

In this case, the area around the top portion of the second interior component is fixed to the pillar portion by a vehicle body fixing portion, and the area around the bottom portion of the second interior component is fixed to the first interior component by the main body joining portion. When the airbag is unfolded, the bottom edge of the second interior component is pushed open, and the main body joining portion of the second interior component is drawn out in the direction in which the bottom side boundary portion extends. As a result, the second interior component also opens up a large unfolding aperture at the end portion in the direction in which the bottom side boundary portion extends. Because of this, it is possible to reduce unnecessary increase in the unfolding resistance of the airbag.

Moreover, the ease of handling is not hampered when the interior component is being mounted on a vehicle body or when it is being transported prior to being mounted on the vehicle body.

(3) It may be arranged such that: the joining component is joined directly to the first interior component at the bottom engaging portion, and the main body joining portion is sandwiched between the first interior component and the joining component.

In this case, boundary portions of both the first interior component and the second interior component are supported by a boundary supporting portion (bottom engaging portion) of the joining component, so that a high level of accuracy can be maintained when these two are being fitted. Moreover, because the main body joining portion of the second interior component is engaged between the joining component and the first interior component, the second interior component is positioned on an extremely rigid joining component, and the second interior component is stably drawn out in the direction in which the bottom wedge thereof extends when the airbag is being unfolded.

(4) It may be arranged such that: a notch which receives the second interior component is formed in the first interior component, and the main body joining portion is placed in a corner portion which is positioned along an extension line in which the bottom side boundary line of the notch extends.

In this case, when the airbag is in a folded state, the area around the corner portion at the end of the second interior component is fixed to the first interior component by the main body joining portion. Accordingly, at this time, the second interior component is positioned relative to the first interior component in the direction in which the bottom side boundary line extends and in a direction which intersects this direction.

Moreover, it is possible to quickly open up the bottom edge of the second interior component.

(5) It may be arranged such that: in the joining component, the top supporting portion and the bottom engaging portion are separate individual components, which are joined together.

In this case, molding such as die-molding and the like is easy which results in a reduction in manufacturing costs.

(6) It may be arranged such that: the bottom edge portion of the second interior component bends and opens when pushed by the unfolding airbag, and the airbag is positioned between the top supporting portion and the bottom engaging portion.

By employing this structure, when an airbag is being unfolded, the airbag presses the second interior component from the inner side between the top supporting portion and the bottom engaging portion. In addition, the second interior component is pushed open from the bottom edge portion thereof taking the hinge adjacent to the top supporting portion as an axis. Because of this, the second interior component can be pushed open in a reliable and stable manner.

(7) It may be arranged such that: the joining component includes non-foamed resin, and the second interior component includes a foamed material.

In this case, the second interior component can be flexible, while maintaining the necessary fitting accuracy because of the function of the top supporting portion and the bottom engaging portion of the joining portion. In addition, deformation in the area around the joined portion of the first interior component and the second interior component is suppressed by the joining component.

(8) It may be arranged such that: the interior component for a vehicle further includes a fixing portion which fixes the first interior component, the second interior component, and the joining component such that they are unable to separate from each other.

As a result, the three components, namely, the first interior component, the second interior component, and the joining component are fixed mainly by the function of the fixing portion.

Accordingly, it is possible to improve the accuracy when fitting these three components, and it is possible to prevent the positions of these three components shifting while the vehicle interior is being transported or the like.

Furthermore, in order to achieve the above-described objects, the present invention employs the following.

(9) A method of mounting an interior component for a vehicle, the interior component including: a garnish fitted onto a vehicle interior side of a pillar portion of the vehicle; a roof lining fitted onto the vehicle interior side of a roof portion of the vehicle; and a frame component joined to a back surface of the garnish, the method comprising: forming through holes respectively in each of the garnish, the frame component, and the roof lining; joining the frame component and the garnish together such that the three through holes overlap each other; superimposing a joined body formed by the garnish and the frame component, with the roof lining, one on top of the other, such that the frame component is sandwiched in the middle, and such that the respective through holes overlap each other; and fitting an engaging component into both the through holes of the joined body and the roof lining, such that the joined body and the roof lining are fixed by this engaging component to a bracket on the vehicle body.

In the above-described method of mounting an interior component for a vehicle, the garnish and the roof lining are mutually positioned so as to sandwich between them the frame component and are then fixed in this position. In this state, the three components, namely, the garnish, the frame component, and the roof lining are mounted on the fixing portion on the vehicle body.

Because of this, an improvement in the fitting accuracy between the garnish and the roof lining is achieved.

(10) It may be arranged such that: the method of mounting an interior component may further include: mounting a shock absorbing component which alleviates an interference shock input into the roof lining, on a back surface of the roof lining; forming a through hole in the shock absorbing component; positioning the through hole of the shock absorbing component between the roof lining and the bracket on the vehicle body; fitting the engaging component into the through holes of the joined body, the roof lining, and the shock absorbing component; and fixing the shock absorbing component, the joined body, and the roof lining via the engaging component to the bracket on the vehicle body.

In this case, the roof lining is accurately positioned on the vehicle body via the shock absorbing component. Because of this, it is possible to further improve the fitting accuracy of the roof lining.

(11) It may be arranged such that: the engaging component is provided with a plurality of supporting surfaces around an insertion axis, which are substantially orthogonal to each other, and the position of the roof lining is restricted by the engaging component.

By employing this structure, the plurality of supporting surfaces of the engaging component are able to reliably restrict any loose motion around the insertion shaft of the three components, namely, the garnish, the frame component, and the roof lining, or of the four components if the shock absorbing component is included. Accordingly, it is possible to improve the positioning accuracy in all directions around the insertion shaft.

DETAILED DESCRIPTION OF THE INVENTION

An embodiment of this invention will be described below based on the drawings. Note that in the description below, unless otherwise specifically stated, the directions up, down, left, right, front, rear and the like indicate directions with referring to the vehicle.

Figure 1:
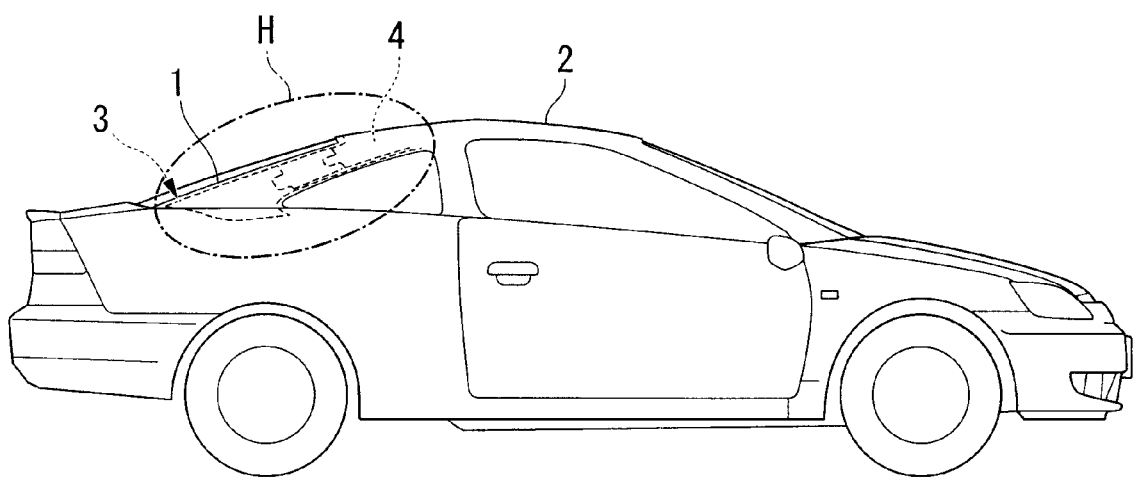
FIG. 1 is a side view of a vehicle showing an embodiment of this invention.

FIG. 1 is a side view showing a coupe type vehicle. The symbol 1 in the drawing is a rear pillar (i.e., a pillar portion) that connects together a vehicle roof portion 2 and a side surface on the rear side of the vehicle body. Because this vehicle is a coupe type vehicle, the rear pillar 1 slopes gently downwards towards the rear of the vehicle body from the roof portion 2.

A pillar garnish 3 and a roof lining 4 which are interior components are mounted respectively on the vehicle interior side of the rear pillar 1 and the roof portion 2. An airbag 5 (see the cross-sectional view in FIG. 7) of a curtain airbag apparatus is mounted in a folded state between a side end portion of the roof portion 2 (i.e., the roof side rail portion) and a portion of the rear pillar 1. The portion where the airbag 5 is housed is hidden from the vehicle interior side by the roof lining 4 and the pillar garnish 3.

Figure 2:
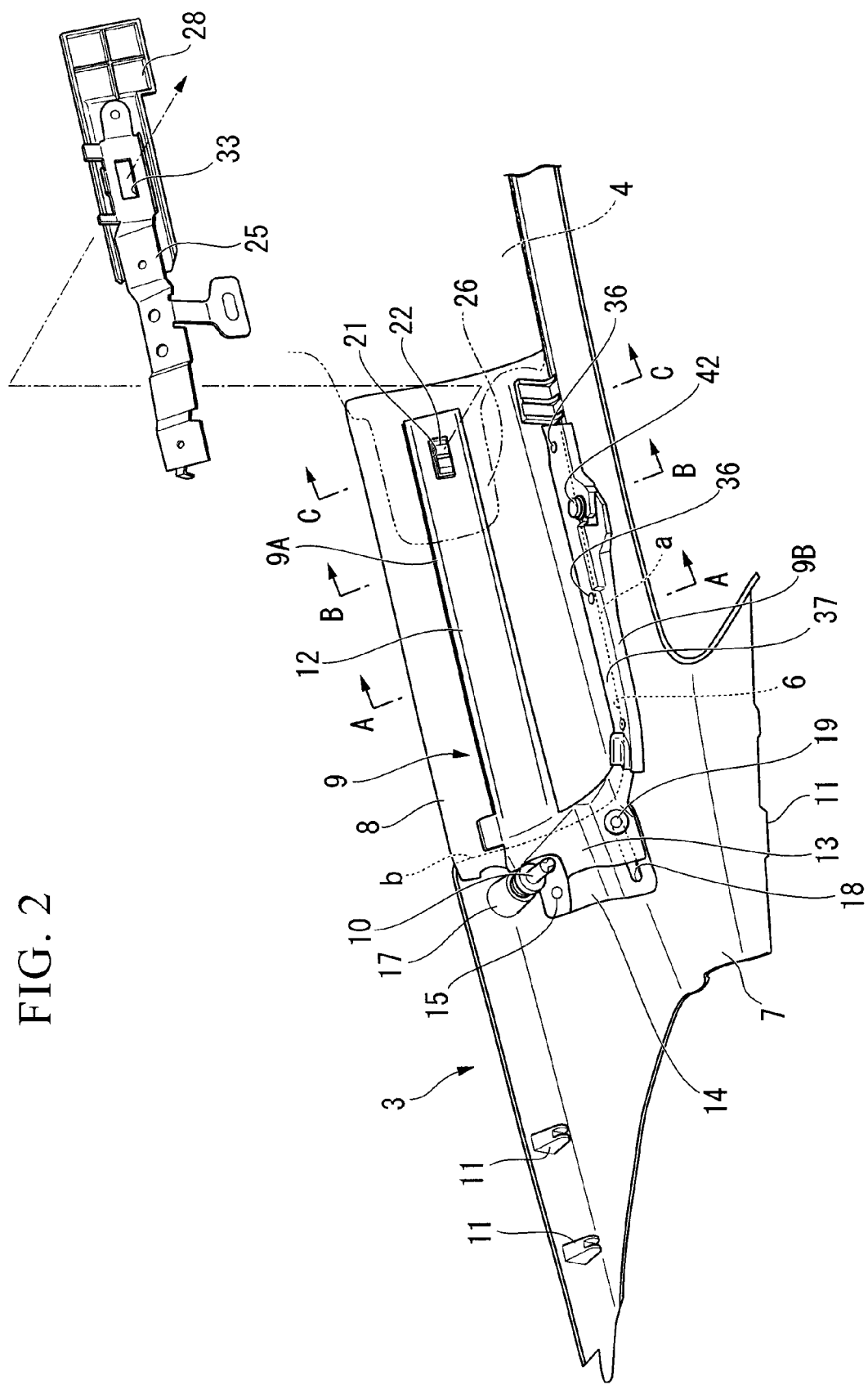
FIG. 2 is a rear view as seen from outside a vehicle showing an interior component located in the H portion shown in FIG. 1 of this same embodiment.
Figure 3:
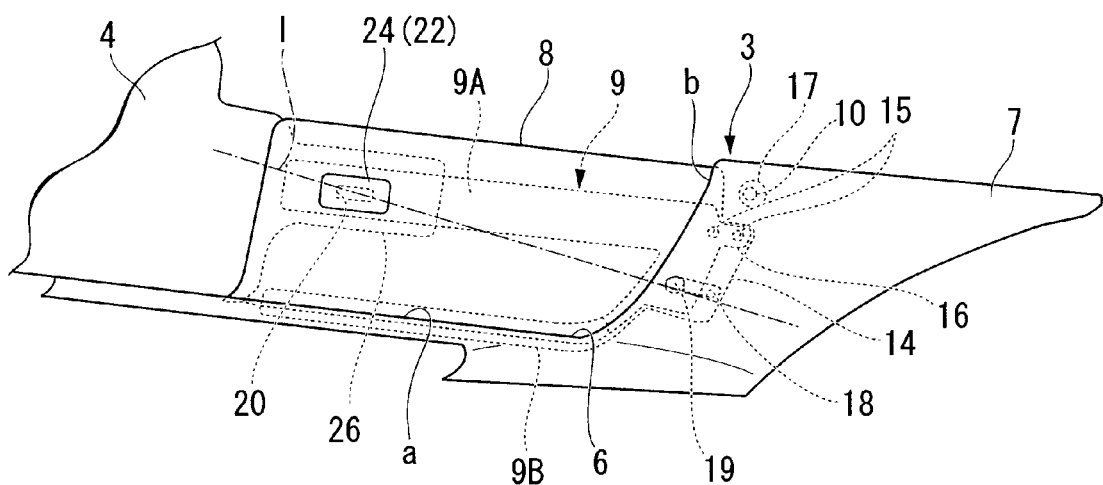
FIG. 3 is a front view as seen from inside a vehicle showing an interior component of this same embodiment.
Figure 4:
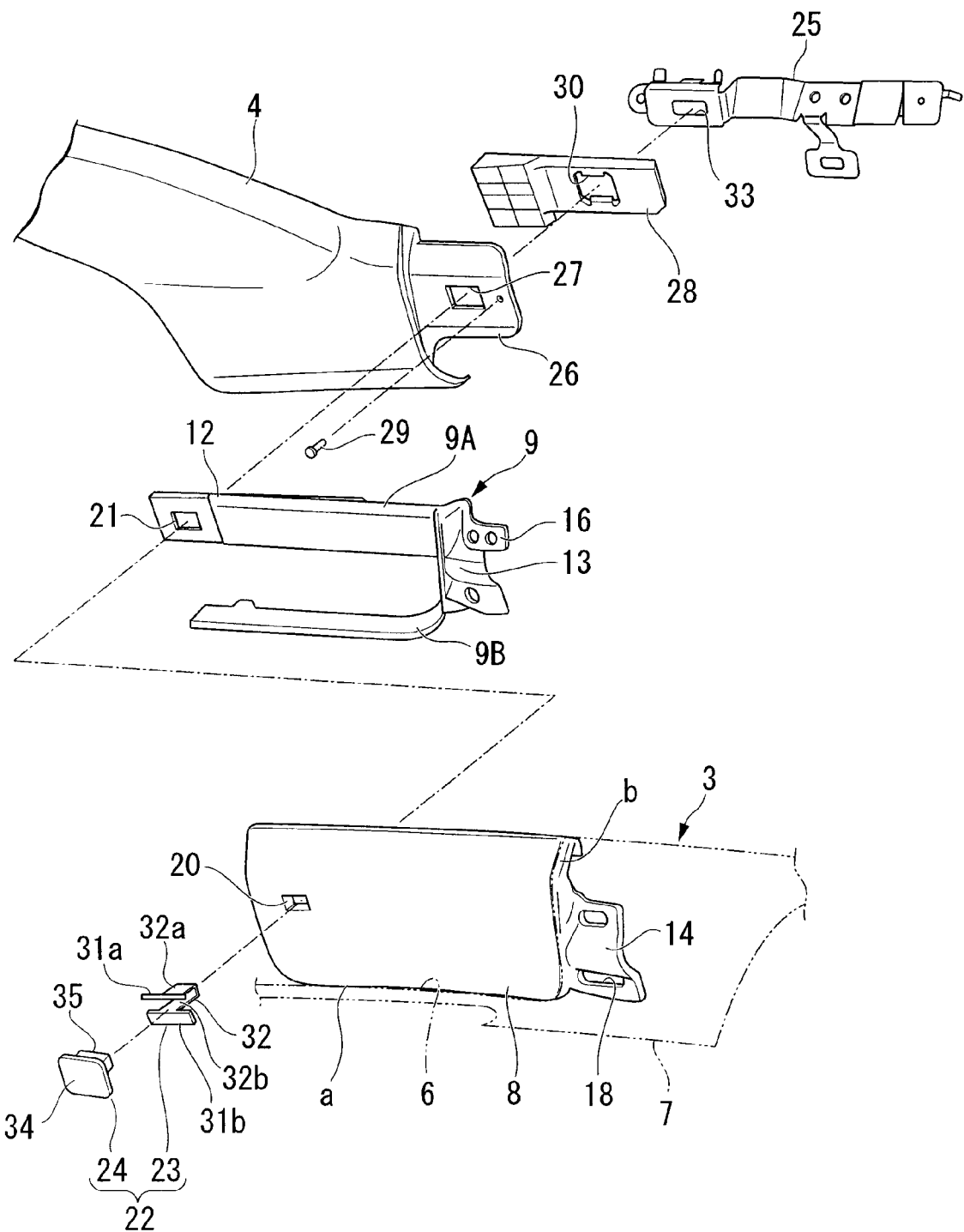
FIG. 4 is an exploded perspective view as seen from inside a vehicle showing an interior component of this same embodiment.
Figure 5:
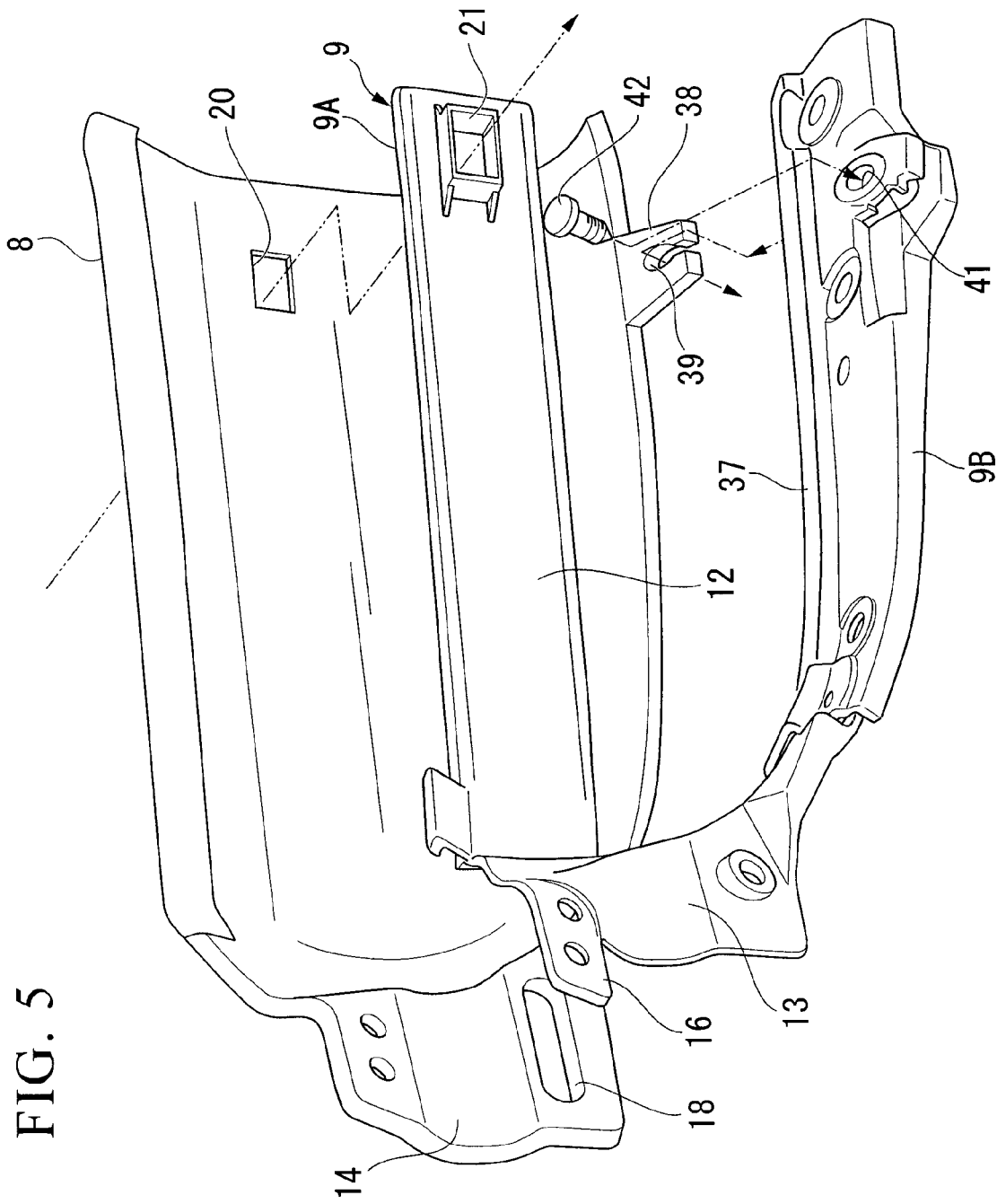
FIG. 5 is an exploded perspective view as seen from outside a vehicle showing an interior component of this same embodiment.

FIG. 2 and FIG. 5 are respectively a perspective view and an exploded perspective view of the pillar garnish 3 as seen from the outside of the vehicle compartment. FIG. 3 and FIG. 4 are respectively a perspective view and an exploded perspective view as seen from the inside of the vehicle compartment showing the state of a connecting portion between an area around a bottom edge on the rear portion side of the roof lining 4 and the pillar garnish 3.

As is shown in these drawings, the pillar garnish 3 is provided with a garnish main body 7 in which a substantially L-shaped notch portion 6 has been cut in an area around a top edge on the front portion side thereof, a substantially rectangular garnish lid 8 which closes off this notch portion 6, and a substantially U-shaped garnish frame 9 which is placed on the back surface side of the garnish lid 8 and principally reinforces the garnish lid 8. The area around the bottom edge on the rear portion side of the roof lining 4 is joined to a front end portion of the garnish lid 8, and together with the garnish lid 8 is placed inside the notch portion 6 of the garnish main body 7. The bottom edges of the roof lining 4 and the garnish lid 8 are placed below the housing portion of the airbag 5, and are pushed open (i.e., they open to form an aperture for the unfolding of the airbag 5) by the thrust force of the airbag 5 when the airbag 5 is unfolded. Note that the roof lining 4 and the garnish lid 8 are both formed using a comparatively soft and easily deformed foamed material (e.g. foamed resin) as the principal material thereof. The garnish main body 7 is engaged with the rear pillar 1 and to a trim component or the like (not shown) on the vehicle interior side by a clip 10 and an engaging claw 11 and the like.

The garnish frame 9 includes a top portion supporting frame component 9A (i.e., a top supporting portion) which supports an area around the top portion of the garnish lid 8 (in the case of this example, an area bulging onto the vehicle interior side which is slightly offset in an upward direction from a position in the center in the vertical direction thereof) substantially in the longitudinal direction of the garnish lid 8, and a bottom portion engaging frame component 9B (i.e., a bottom engaging portion) that is mounted so as to face a bottom end (i.e., a bottom side boundary line) of the notch portion 6 in the garnish main body 7 and so as to extend along a bottom side boundary portion (a) between the garnish lid 8 and the garnish main body 7, and engages the bottom edge portion of the garnish lid 8. These components are joined together integrally by screws or the like. The frame components 9A and 9B are formed from a hard resin material. This hard resin material may be a non-foam resin.

The top portion supporting frame component 9A is provided with a longitudinal extended portion 12 which extends substantially rectilinearly in a longitudinal direction from the vicinity of the front end to the rear end portion of the garnish lid 8, and with a curved extended portion 13 which extends in a curve from a rear end of this longitudinal extended portion 12 along a rear portion side boundary portion b between the garnish lid 8 and the garnish main body 7. The bottom end of this curved extended portion 13 is joined to a rear end portion of the bottom portion engaging frame component 9B.

A substantially rectangular-shaped tongue portion 14 which extends beyond the notch portion 6 around to the back surface side of the garnish main body 7 is formed integrally with the rear end portion of the garnish lid 8. Two locations at the front and rear of the top edge side of this tongue portion 14 are joined integrally by screws 15 to the garnish main body 7 and the curved extended portion 13 of the top portion supporting frame component 9A. The portions that are fixed by these screws 15 form a fixing portion for fixing the garnish main body 7, the garnish lid 8, and the garnish frame 9 such that they are unable to be separated from each other. Moreover, a boss portion 17 that is used for fixing to the vehicle body protrudes from a position in the vicinity of the aforementioned fixing portion on the back surface side of the garnish main body 7. This boss portion 17 is fixed to the rear pillar 1 by the clip 10. Accordingly, the rear end side of the area around the top portion of the garnish lid 8 is fixed to the rear pillar 1 by the screws 15 and the clip 10. The screws 15 and the clip 10 form a vehicle body fixing portion on the rear end side of the area around the top portion.

An elongated hole 18 that extends in the direction in which the bottom side boundary portion (a) extends is formed in a bottom edge of the tongue portion 14 (i.e., in an area of a corner portion at the end of the garnish main body 7 along the direction in which the bottom side boundary portion (a) extends). The bottom edge of the curved extended portion 13 on the garnish frame 9 is joined to the back surface of the garnish main body 7 by a bolt 19 that passes through this elongated hole 18. In addition, the bottom edge of the tongue portion 14 is placed between a fastening portion formed by the garnish frame 9 and the bolt 19 of the garnish main body 7, and the elongated hole 18 portion is able to slide relative to the bolt 19. As a result, the bottom edge of the tongue portion 14 is permitted to be displaced relatively to the garnish main body 7 along the bottom side boundary portion (a). Accordingly, the relative displacement of the bottom edge of the tongue portion 14 relative to the garnish main body 7 along the bottom side boundary portion (a) is permitted by the bolt 19 and the elongated hole 18, while relative displacement thereof in all other directions is restricted. The portions that are joined by the bolt 19 and the elongated hole 18 form a main body join portion of the area around the bottom portion of the garnish lid 8.

Moreover, a substantially rectangular mounting hole 20 (i.e., a through hole) is formed in the vicinity of the front end side of the area around the top portion of the garnish lid 8. In addition, a substantially rectangular through hole 21 is formed in the top portion supporting frame component 9A of the garnish frame 9 corresponding to the position where the mounting hole 20 is formed in the garnish lid 8. A clip 22 which is an engaging component is inserted continuously from the vehicle interior side into both the mounting hole 20 and the through hole 21. By this clip, the area around the top portion of the garnish lid 8 is joined in a state of overlapping with the top portion supporting frame component 9A. The join portion which is formed by this clip 22 forms a vehicle body fixing portion on the front end side of the area around the top portion of the garnish lid 8.

As is shown in FIG. 4, the clip 22 is formed by a clip main body 23 which is made from metal, and by a clip cap 24 (i.e., a main body supporting component) which is made from resin and is mounted from the vehicle interior side on the clip main body 23. The clip main body 23 mainly joins the garnish lid 8 and the garnish frame 9 to a fixing bracket 25 on the rear pillar 1 side (i.e., a vehicle side fixing component), and lastly a clip cap 24 conceals the clip main body 23 from the vehicle interior side.

As is shown in FIG. 3 and FIG. 4, a substantially rectangular connection bracket 26 that extends around to the back surface side of the front end portion of the garnish lid 8 is provided in an area around the bottom edge of the rear portion side of the roof lining 4. A substantially rectangular through hole 27 is formed in this connection bracket 26. Moreover, a shock absorbing component 28 that is interposed between the back surface of the roof lining 4 and the rear pillar 1 and absorbs interference shock from the vehicle interior side of the roof lining 4 is attached by a screw 29 (see FIG. 4) to a back surface of this connection bracket 26. This shock absorbing component 28 is formed from a comparatively hard non-foam resin material. A through hole 30 of the same type is formed in a position in the shock absorbing component 28 corresponding to the through hole 27 in the connection bracket 26.

Figure 8:
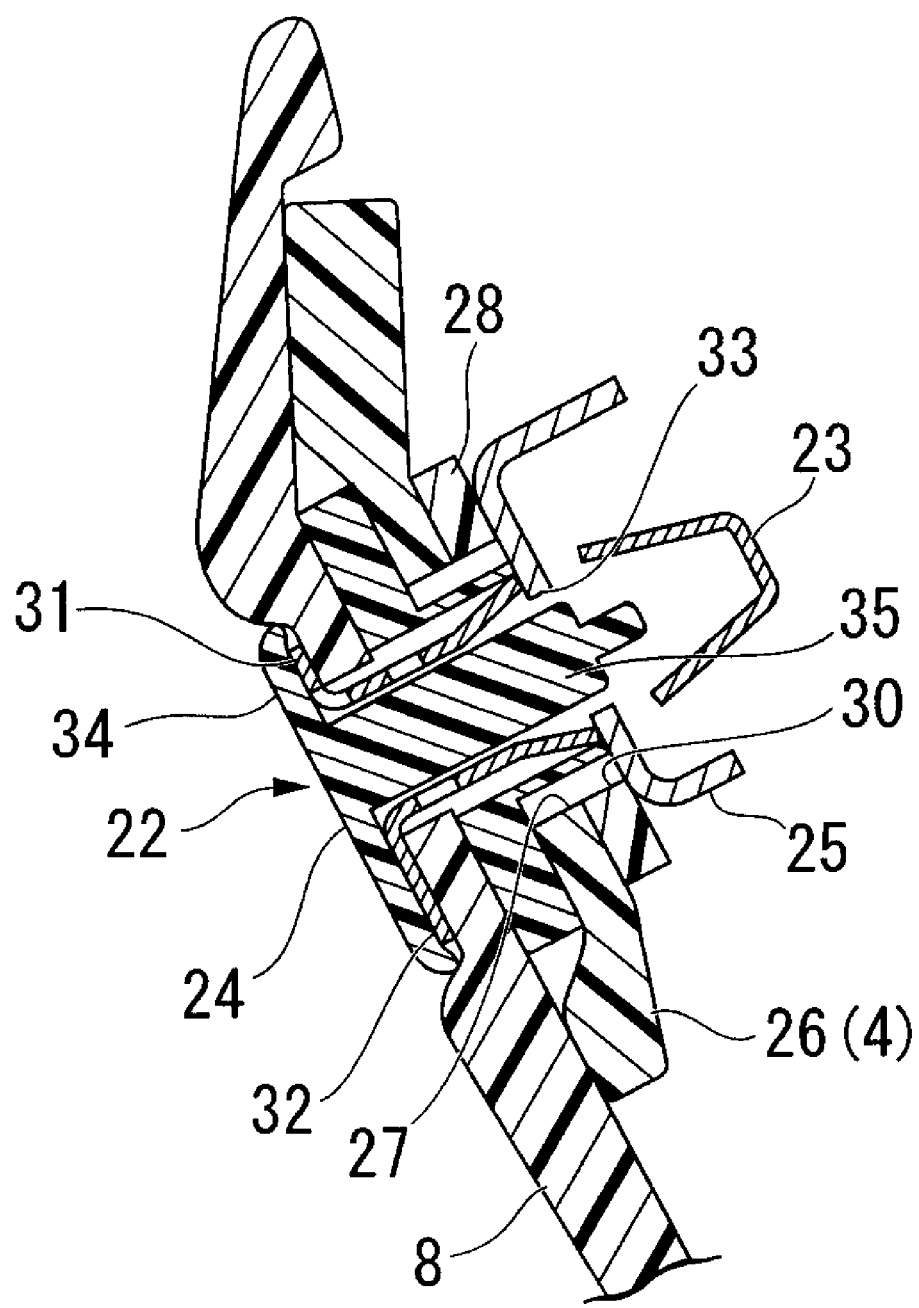
FIG. 8 is a cross-sectional view corresponding to the cross section C-C in FIG. 2 showing this same embodiment.

The clip main body 23 has a top portion flange 31a and a bottom portion flange 31b that are superimposed on an aperture edge on the vehicle interior side of the mounting hole 20 in the garnish lid 8. In conjunction with this, the clip main body 23 has a leg portion 32 that has a substantially U-shaped cross section and extends in the insertion direction from the base portion of the two flanges 31a and 31b. As is shown in cross-sectional view in FIG. 8, after the leg portion 32 has been fitted into the mounting hole 20 in the garnish lid 8 and the through hole 21 in the garnish frame 9, it is engaged in an engaging hole 33 in the fixing bracket 25 on the vehicle body side. At this time, the connection flange 26 and the shock absorbing component 28 are superposed on the back surface of the top portion supporting frame component 9A by matching the positions of the through holes 27 and 30 with the position of the through hole 21 in the top portion supporting frame component 9A, and by engaging the leg portion 32 of the clip main body 23 with the fixing bracket 25, the connection flange 26 and the shock absorbing component 28 are held fixed between the top portion supporting frame component 9A and the fixing bracket 25. Note that the clip cap 24 is provided with a flat cover flange 34 that covers the top portion flange 31a and the bottom portion flange 31b of the clip main body 23 from the vehicle interior side, and with a supporting shaft 35 that extends from the center of the cover flange 34 and whose end portion is press-inserted inside the leg portion 32 of the clip main body 23. Note that because the leg portion 32 of the clip main body 23 has a structure in which a pair of mutually facing walls 32a having substantially the same width extend in parallel with the axial direction thereof, the outside surfaces and side surfaces of these facing walls 32a function as supporting surfaces that are in contact with the inner surfaces of the substantially rectangular mounting hole 20 and through holes 21, 27, and 30.

Figure 6:
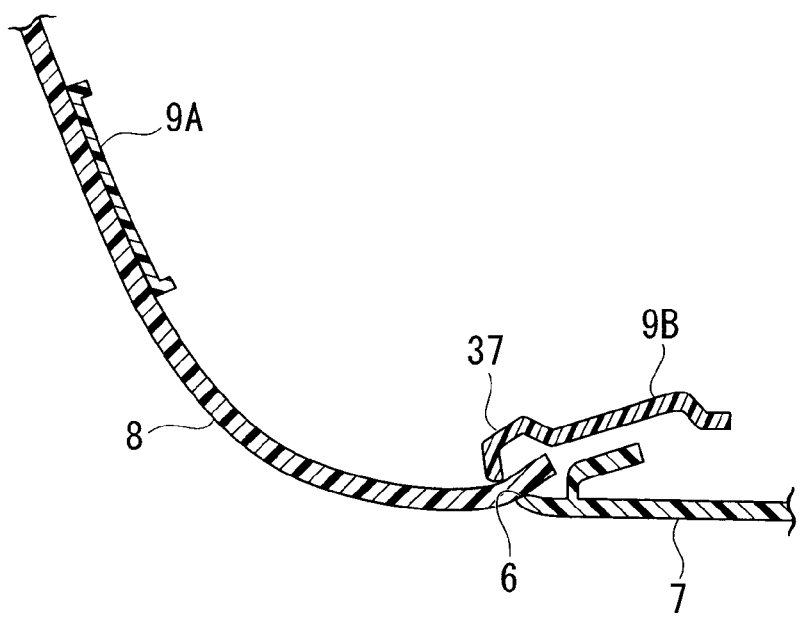
FIG. 6 is a cross-sectional view corresponding to the cross section A-A in FIG. 2 showing this same embodiment.

Moreover, as is shown in FIG. 2, a plurality of locations on the bottom portion engaging frame component 9B of the garnish frame 9 that are mutually separated in the longitudinal direction are joined to positions along the bottom end of the notch portion 6 of the back surface side of the garnish main body 7 by screws 36. As is shown in cross-sectional view in FIG. 6 and FIG. 7, an engaging flange 37 (i.e., a gripping join portion) whose distal end is bent substantially in a U shape is formed on a top edge portion of the bottom portion engaging frame component 9B. A bottom edge of the garnish lid 8 is gripped between the engaging flange 37 and the edge of the garnish main body 7. The bottom end of the garnish lid 8 is inserted into the rear side of the edge which faces the notch portion 6 of the garnish main body 7 over substantially the entire range thereof in the longitudinal direction, and is gripped and fixed by this edge and by the engaging flange 37 of the bottom portion engaging frame component 9B.

Figure 9:
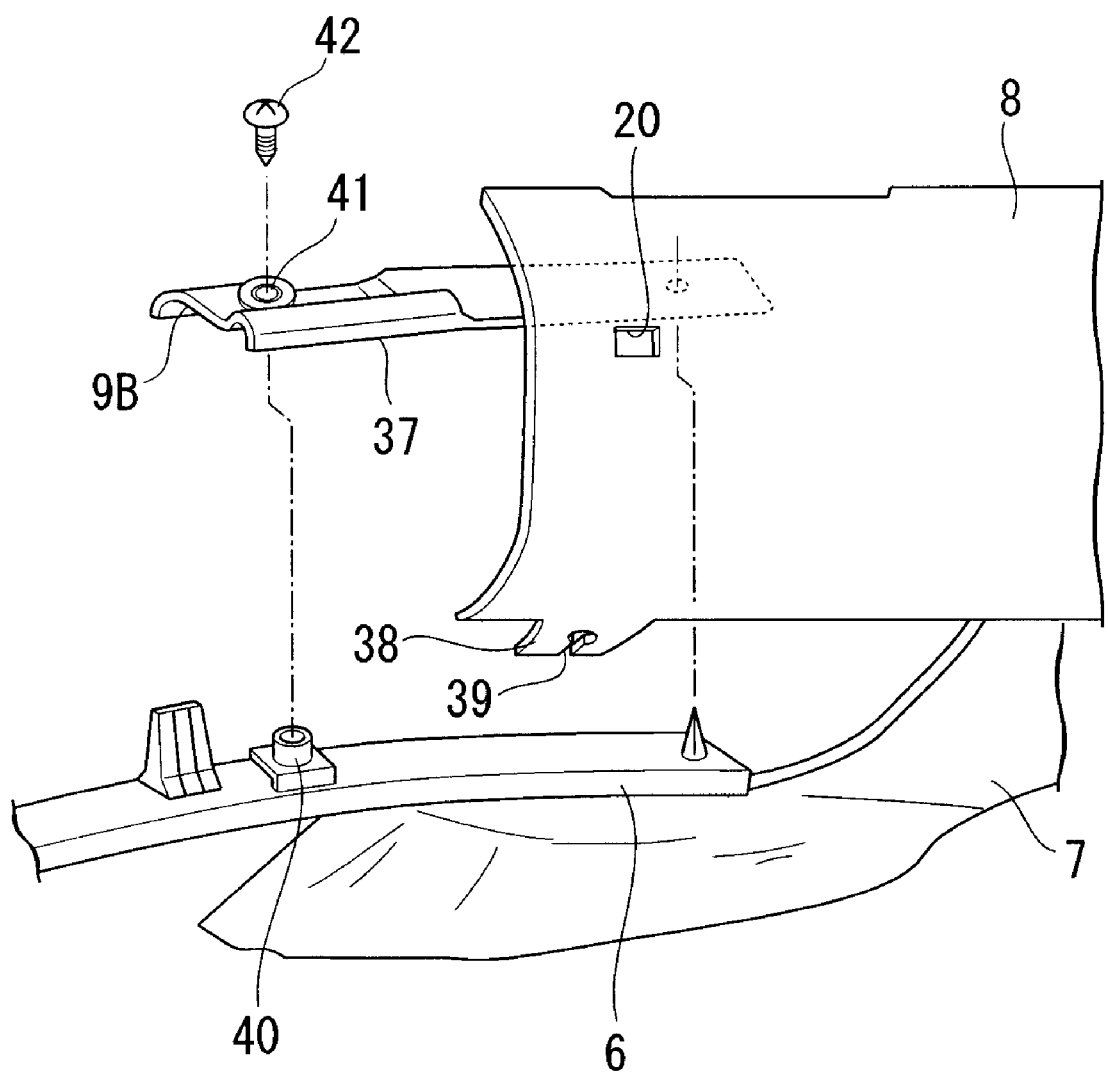
FIG. 9 is an exploded perspective view as seen from inside a vehicle showing an interior component of this same embodiment.

FIG. 9 is an exploded perspective view as seen from an inner side of the vehicle compartment showing an engaging portion between the garnish main body 7 and the bottom end side of the garnish lid 8.

Figure 7:
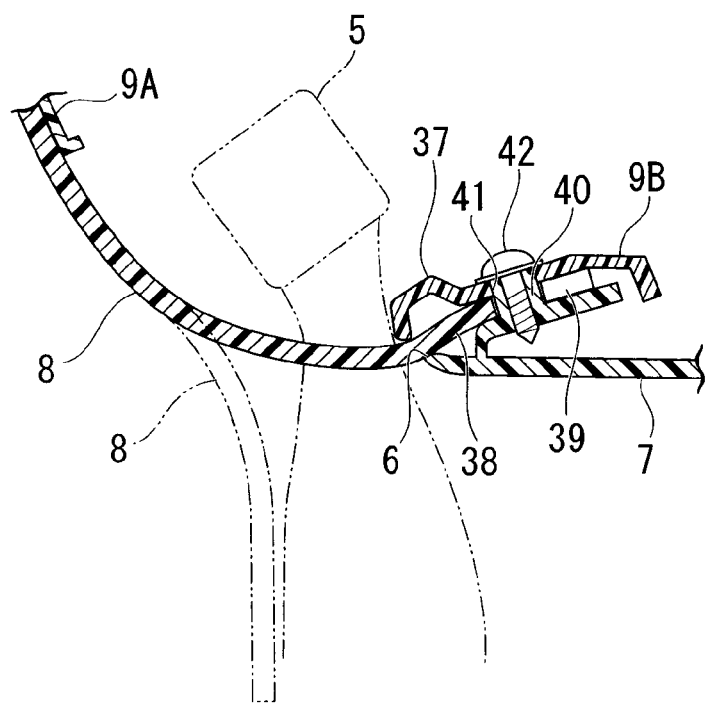
FIG. 7 is a cross-sectional view corresponding to the cross section B-B in FIG. 2 showing this same embodiment.

As is shown in FIG. 9, FIG. 5, and FIG. 7, an auxiliary gripping piece 38 (i.e., an auxiliary join portion) that extends in the direction of the bottom end is provided on a portion of the bottom edge of the garnish lid 8 which is adjacent to the front end portion. A substantially U-shaped slit 39 that is open towards the distal end side is formed in the auxiliary gripping piece 38. In addition, a boss portion 40 is formed in an edge portion of the back surface side of the garnish main body 7 at a position which is separated in the transverse direction (i.e., downwards) from the notch portion 6 (i.e., the bottom portion side boundary portion a). A through hole 41 into which is fitted a distal end portion of the boss portion 40 is formed in a location on the bottom portion engaging frame component 9B which corresponds to the boss portion 40. When the bottom edge of the garnish lid 8 is engaged in an inserted state between the engaging flange 37 and the edge of the garnish main body 7, the slit 39 of the auxiliary gripping piece 38 is joined to the outer circumference of the boss portion 40 and a screw 42 (i.e., an auxiliary join portion) is fastened to the boss portion 40 which penetrates the through hole 41 in the bottom portion engaging frame component 9B. As a result, the auxiliary gripping piece 38 is gripped and fixed between the bottom portion engaging frame component 9B and the garnish main body 7.

Here, as has been described above, the garnish frame 9 reinforces the area around the top portion of the garnish lid 8 by the top portion supporting frame component 9A, and also grips the bottom edge of the garnish lid 8 at two locations, namely, at a portion in the vicinity of the bottom side boundary portion (a) and at the auxiliary gripping piece 38 portion which is separated from the bottom side boundary portion (a). As is shown in FIG. 7, the folded airbag 5 is placed in a position above a substantially U-shaped space portion that is enclosed by the top portion supporting frame component 9A and the bottom portion engaging frame component 9B. When the airbag 5 is unfolded, the grip on the two locations of the bottom edge of the garnish lid 8 by the garnish main body 7 and the bottom portion engaging frame component 9B is released by the thrust force of the airbag 5 as it moves rapidly downwards, and the bottom edge of the garnish lid 8 is pushed open on the vehicle interior side as is shown by the broken line in FIG. 7. Note that the engaging load at the auxiliary gripping piece 38 on the garnish lid 8 is set so as to be greater than the engaging load thereon at the engaging flange 37.

The pillar garnish 3 which has been described above is constructed with the garnish main body 7, the garnish lid 8, and the garnish frame 9 as individual separate components, and these three components are assembled in advance at a stage prior to their being fitted onto the vehicle body. The pillar garnish 3 which has been assembled in advance in this manner is transported in this state to the vehicle body assembly position, and is fitted onto the vehicle body using clips or the like together with other interior components such as the roof lining 4 and the like.

When the pillar garnish 3 is being mounted on the rear pillar 1, the mounting hole 20 in the garnish lid 8 is positioned directly over the through hole 21 in the garnish frame 9, and the leg portion 32 of the clip main body 23 is fitted therein. In this state, a distal end portion of the leg portion 32 of the clip main body 23 which is protruding from the garnish frame 9 is inserted into the through hole 27 in the roof lining 4 and the through hole 30 in the shock absorbing component 28. Next, the distal end portion of the leg portion 32 is pushed into the engaging hole 33 in the fixing bracket 25 and is engaged therein. As a result, the joint body formed by the garnish lid 8 and the garnish frame 9, the roof lining 4, and the shock absorbing component 28 are gripped and fixed on the vehicle body side by the clip main body 23.

When the airbag 5 is actually unfolding, when the airbag 5 presses the bottom edge of the garnish lid 8 from the inner side, the bottom edge of the garnish lid 8 is released from the gripping portion formed by the garnish main body 7 and the bottom portion engaging frame component 9B. The bottom edge of the garnish lid 8 is pushed open onto the vehicle interior side using as an axis a hinge support point I (see FIG. 3) that connects the join portion formed by the clip 22 to the join portion formed by the bolt 19. In addition to this, the tongue portion 14 is displaced relatively to the bolt 19 at the elongated hole 18 portion, and the rear end side of the garnish lid 8 is pulled back a long way onto the vehicle interior side following the bottom side boundary portion (a). Because of this, the garnish lid 8 smoothly opens up a large unfolding aperture for the airbag 5 without receiving any large restricting force on the rear end side thereof. Accordingly, by employing this mounting structure, it is possible to reduce unnecessary increase in the unfolding resistance of the airbag 5.

In this pillar garnish 3, the substantially U-shaped garnish frame 9 is placed on the back surface side of the garnish lid 8, and the area around the top portion of the garnish lid 8 is fixed to the rear pillar 1 by the clips 10 and 22 via the top portion supporting frame component 9A of the garnish frame 9. In conjunction with this, the bottom edge portion of the garnish lid 8 is engaged with the garnish main body 7 via the bottom portion engaging frame component 9B of the garnish frame 9. Furthermore, the bottom end of the tongue portion 14 at the rear end of the garnish lid 8 is joined to the garnish main body 7 by the elongated hole 18 and the bolt 19 such that it is able to be relatively displaced in the direction in which the bottom side boundary portion (a) extends. Because of this, it is possible to reliably maintain an integrally assembled state during assembly on the vehicle body or during transportation, and there is no reduction in the ease of handling.

Moreover, in this pillar garnish 3, because the area around the top portion of the garnish lid 8 is reinforced by the top portion supporting frame component 9A of the garnish frame 9, and because the bottom edge of the garnish lid 8 is gripped and held by the bottom portion engaging frame component 9B of the garnish frame 9 which is fixed to the garnish main body 7, the rigidity of the area around the top portion of the garnish lid 8 is increased, and the area around the bottom portion thereof is held while tension is being imparted thereto. In addition to this, it possible for the fitting accuracy between the area around the bottom portion of the garnish lid 8 and the garnish main body 7 to be improved.

Although it is particularly difficult to obtain an accurate fitting when the garnish lid 8 is formed using a foam resin material as the principal constituent thereof, in the present embodiment, it is possible to reliably improve the fitting accuracy, by the function of the above-described garnish frame 9.

In addition, in the case of this pillar garnish 3, while the area around the top portion of the garnish lid 8 is reinforced by the top portion supporting frame component 9A and is attached to the rear pillar 1, the area around the bottom portion of the garnish lid 8 is engaged by the bottom portion engaging frame component 9B. Moreover, the airbag 5 is placed above a position substantially in the center between the top portion supporting frame component 9A and the bottom portion engaging frame component 9B. Because of this, when the airbag 5 is unfolding, the bottom edge of the garnish lid 8 can be caused to operate so as to open up stably taking the vicinity of the top portion supporting frame component 9A as the hinge support point I.

Moreover, because the pillar garnish 3 of the present embodiment forms a garnish frame 9 in which the top portion supporting frame component 9A and the bottom portion engaging frame component 9B which are formed as separate individual components are joined together, molding such as die-molding and the like is easy, leading to an advantageous effect that it is possible for a corresponding reduction in manufacturing costs to be achieved.

Moreover, in the pillar garnish 3 of this embodiment, the vicinity of the corner area at an end of the bottom edge of the garnish lid 8 is joined to the elongated hole 18 by the bolt 19. Accordingly, it is advantageous in that, it is possible to accurately position the bottom edge of the garnish lid 8 in a direction intersecting the direction in which the bottom side boundary portion (a) extends, and to fix it in this position, while being able to quickly open up the garnish lid.

Furthermore, in the case of this pillar garnish 3, in a state in which the tongue portion 14 at the rear end of the garnish lid 8 has been inserted between the garnish main body 7 and the garnish frame 9, it is joined by the elongated hole 18 and the bolt 19. Because of this, movement in the direction of the back surface of the tongue portion 14 is restricted, and it is possible to obtain an improvement in accuracy when positioning the garnish lid 8. Together with this, the operation when the airbag 5 is being unfolded to draw out the garnish lid 8 in the direction in which the bottom side boundary portion (a) extends can be made more stable.

Moreover, in this pillar garnish 3, the three components of the garnish main body 7, the garnish lid 8, and the garnish frame 9 are positioned and fixed using the screws 15 at a position at the rear end of the garnish lid. Because of this, it is possible to increase the accuracy with which these three components are fitted together. Moreover, it is possible in advance to prevent the positions of these three components shifting while they are being transported or the like.

In the mounting structure for an interior component which is employed here, the garnish frame 9 (i.e., the top portion supporting frame component 9A) which is formed from a hard resin material, is inserted between the garnish lid 8 and the roof lining 4 which are formed from a comparatively flexible foam resin material. Moreover, the leg portion 32 of the clip main body 23 which has been inserted through the mounting hole 20 in the garnish lid 8 and the through hole 21 in the garnish frame 9 is fitted into the through hole 27 in the roof lining 4. Moreover, the distal end portion of the leg portion 32 is engaged with the fixing bracket 25 on the rear pillar 1 side. Accordingly, the components can be assembled while a high level of fitting accuracy between the garnish lid 8 and the roof lining 4 is maintained.

In the clip 22, which is an engaging component, the pair of facing walls 32a of the leg portion 32 of the clip main body 23 have an essentially rectangular cross-sectional outer shape. Because of this, the facing walls 32a are in contact with the respective inner surfaces of the mounting hole 20 in the garnish lid 8 and the through hole 21 in the garnish frame 9 via a plurality of supporting surfaces which are orthogonal to each other. Accordingly, it is possible to improve the positioning accuracy in a direction around the insertion axes of the garnish lid 8 and the garnish frame 9.

Furthermore, in this embodiment, the shock absorbing component 28 is placed between the roof lining 4 and the rear pillar 1. Moreover, the leg portion 32 of the clip main body 23 is inserted through the through hole 27 in the roof lining 4, and is further fitted into the through hole 30 in the shock absorbing component 28, and is thereafter engaged in the fixing bracket 25. Because of this, the shock absorbing component 28 which supports the roof lining 4 and the back portion thereof can be accurately positioned, and the fitting accuracy of the roof lining 4 can be further improved.

Note that this invention is not limited to the above-described embodiment and various design modifications can be made insofar as they do not depart from the spirit or scope of this invention.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

What is claimed is:

1. An interior component for a vehicle formed by superimposing a bottom edge portion of a second interior component on a top edge portion of a first interior component or by placing these portions so as to face against each other, and by joining these interior components together by a joining component, wherein the joining component includes:
   a top supporting portion joined to a back surface of the second interior component, which supports a top edge side of the second interior component; and
   a bottom engaging portion provided underneath of and separated from the top supporting portion, which engages the bottom edge of the second interior component with the first interior component.

2. The interior component for a vehicle according to claim 1, wherein a vehicle body fixing portion fixed to a pillar portion of a vehicle body is provided in an area around a top portion of the second interior component, and a main body joining portion is provided to the second interior component in an area below the vehicle body fixing portion, the main body joining portion joined to the first interior component so as to allow relative displacement of the second interior component in a direction in which a bottom side boundary portion between the first interior component and the second interior component extends.

3. The interior component for a vehicle according to claim 2, wherein the joining component is joined directly to the first interior component at the bottom engaging portion, and the main body joining portion is sandwiched between the first interior component and the joining component.

4. The interior component for a vehicle according to claim 2, wherein a notch which receives the second interior component is formed in the first interior component, and the main body joining portion is placed in a corner portion which is positioned along an extension line in which the bottom side boundary line of the notch extends.

5. The interior component for a vehicle according to claim 1, wherein in the joining component, the top supporting portion and the bottom engaging portion are separate individual components, which are joined together.

6. The interior component for a vehicle according to claim 1, wherein the bottom edge portion of the second interior component bends and opens when pushed by an airbag as the airbag unfolds, and the airbag is positioned between the top supporting portion and the bottom engaging portion.

7. The interior component for a vehicle according to claim 1, wherein the joining component includes non-foamed resin, and the second interior component includes a foamed material.

8. The interior component for a vehicle according to claim 1, further comprising a fixing portion which fixes the first interior component, the second interior component, and the joining component such that they are unable to separate from each other.

9. A method of mounting an interior component for a vehicle, the interior component including:
- a garnish fitted onto a vehicle interior side of a pillar portion of the vehicle;
- a roof lining fitted onto the vehicle interior side of a roof portion of the vehicle; and
- a frame component joined to a back surface of the garnish, the method comprising:
- forming through holes respectively in each of the garnish, the frame component, and the roof lining;
- joining the frame component and the garnish together such that the three through holes overlap each other;
- superimposing a joined body formed by the garnish and the frame component, with the roof lining, one on top of the other, such that the frame component is sandwiched in the middle, and such that the respective through holes overlap each other; and
- fitting an engaging component into both the through holes of the joined body and the roof lining, such that the joined body and the roof lining are fixed by this engaging component to a bracket on the vehicle body.

10. The method of mounting an interior component for a vehicle according to claim 9, further comprising:
- mounting a shock absorbing component which alleviates an interference shock input into the roof lining, on a back surface of the roof lining;
- forming a through hole in the shock absorbing component;
- positioning the through hole of the shock absorbing component between the roof lining and the bracket on the vehicle body;
- fitting the engaging component into the through holes of the joined body, the roof lining, and the shock absorbing component; and
- fixing the shock absorbing component, the joined body, and the roof lining via the engaging component to the bracket on the vehicle body.

11. The method of mounting an interior component for a vehicle according to claim 9, wherein the engaging component is provided with a plurality of supporting surfaces around an insertion axis, which are substantially orthogonal to each other, and the position of the roof lining is restricted by the engaging component.

* * * * *